United States Patent
Yoshinaga (10) Patent No.: US 10,945,409 B2
(45) Date of Patent: Mar. 16, 2021

(54) METHOD AND APPARATUS FOR MANUFACTURING EXCREMENT TREATMENT MATERIAL

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 66 days.

(21) Appl. No.: 16/268,803

(22) Filed: Feb. 6, 2019

(65) Prior Publication Data

US 2019/0166790 A1 Jun. 6, 2019

Related U.S. Application Data

(63) Continuation of application No. PCT/JP2017/028197, filed on Aug. 3, 2017.

(30) Foreign Application Priority Data

Sep. 5, 2016 (JP) .............................. JP2016-172665

(51) Int. Cl.
*A01K 1/015* (2006.01)
*B01J 2/20* (2006.01)
*B30B 11/22* (2006.01)

(52) U.S. Cl.
CPC ............... *A01K 1/0155* (2013.01); *B01J 2/20* (2013.01); *B30B 11/221* (2013.01); *B30B 11/227* (2013.01); *B30B 11/228* (2013.01)

(58) Field of Classification Search
None
See application file for complete search history.

(56) References Cited

U.S. PATENT DOCUMENTS

| 4,772,430 A * | 9/1988 | Sauda ................. B29B 17/0026 588/8 |
| 5,393,473 A * | 2/1995 | Payer ........................ B29B 9/06 264/117 |
| 2011/0204166 A1 | 8/2011 | Mochizuki |
| 2015/0107524 A1* | 4/2015 | Hiroshima ........... A01K 1/0154 119/171 |

(Continued)

FOREIGN PATENT DOCUMENTS

| GB | 2008612 | * | 6/1979 |
| JP | H08-323323 A | | 12/1996 |

(Continued)

OTHER PUBLICATIONS

Aug. 29, 2017 Search Report issued in International Patent Application No. PCT/JP2017/028197.

(Continued)

*Primary Examiner* — Mary Lynn F Theisen
(74) *Attorney, Agent, or Firm* — Oliff PLC (57) ABSTRACT

The manufacturing method includes a granulation step. The granulation step is a step of forming a plurality of granules by performing extrusion granulation on a granulation material using a granulation machine. The granulation machine includes a die. A plurality of through holes that allow the granulation material to pass therethrough are formed in the die. The plurality of through holes include first through holes having a first diameter, and second through holes having a second diameter that is smaller than the first diameter.

16 Claims, 13 Drawing Sheets

(56) References Cited

U.S. PATENT DOCUMENTS

| | | | | |
|---|---|---|---|---|
| 2015/0272078 A1* | 10/2015 | Ikegami | ................ | B30B 11/228 |
| | | | | 264/40.1 |
| 2016/0082416 A1* | 3/2016 | Mochizuki | ........... | A01K 1/0155 |
| | | | | 119/171 |

FOREIGN PATENT DOCUMENTS

| | | |
|---|---|---|
| JP | 2001-25732 A | 1/2001 |
| JP | 2011-172515 A | 9/2011 |
| JP | 2016-67329 A | 5/2016 |

OTHER PUBLICATIONS

Aug. 29, 2017 Written Opinion issued in International Patent Application No. PCT/JP2017/028197.

* cited by examiner

METHOD AND APPARATUS FOR MANUFACTURING EXCREMENT TREATMENT MATERIAL

CROSS REFERENCE TO RELATED APPLICATION

This is a Continuation of International Application No. PCT/JP2017/028197 filed Aug. 3, 2017, which claims the benefit of Japanese Application No. 2016-172665 filed Sep. 5, 2016. The contents of these applications are hereby incorporated by reference in their entirety.

TECHNICAL FIELD

The present invention relates to a method and an apparatus for manufacturing an excrement treatment material.

BACKGROUND ART

A conventional excrement treatment material is disclosed in, for example, Patent Document 1. The excrement treatment material is composed of a plurality of cylindrical grains. The plurality of grains include two types of grains that have different diameters. That is, grains (first grains) that have a first diameter, and grains (second grains) that have a second diameter that is smaller than the first diameter exist in a mixed manner.

CITATION LIST

Patent Document

Patent Document 1: JP 2016-67329 A

SUMMARY OF INVENTION

Technical Problem

The excrement treatment material in which grains of different diameters exist in a mixed manner as described above is conventionally manufactured by separately forming grains having a relatively large diameter and grains having a relatively small diameter, and thereafter mixing the both grains However, executing the mixing step has been a factor that adds complexity to the process for manufacturing an excrement treatment material.

Solution to Problem

The present invention has been made in view of the problem described above, and it is an object of the present invention to provide a method and an apparatus for manufacturing an excrement treatment material, with which it is possible to obtain an excrement treatment material that contains grains of different diameters in a mixed manner, without executing a mixing step.

A method for manufacturing an excrement treatment material according to the present invention includes a granulation step of forming a plurality of granules by performing extrusion granulation on a granulation material using a granulation machine. The granulation machine includes a die in which a plurality of through holes that allow the granulation material to pass therethrough are formed. The plurality of through holes include first through holes having a first diameter, and second through holes having a second diameter that is smaller than the first diameter.

According to the manufacturing method, the granulation machine including the die in which the first and second through holes are formed is used. The diameter (second diameter) of the second through holes is smaller than the diameter (first diameter) of the first through holes. For this reason, granules having a relatively large diameter are obtained from the granulation material that has passed through the first through holes, and granules having a relatively small diameter are obtained from the granulation material that has passed through the second through holes. Accordingly, it is possible to obtain an excrement treatment material that contains grains of different diameters in a mixed manner, without executing a mixing step after the granulation step.

Also, an apparatus for manufacturing an excrement treatment material according to the present invention includes a granulation machine that forms a plurality of granules by performing extrusion granulation on a granulation material. The granulation machine includes a die in which a plurality of through holes that allow the granulation material to pass therethrough are formed. The plurality of through holes include first through holes having a first diameter, and second through holes having a second diameter that is smaller than the first diameter.

The manufacturing apparatus includes the granulation machine including the die in which the first and second through holes are formed. The second through holes have a smaller diameter than the first through holes. For this reason, granules having a relatively large diameter are obtained from the granulation material that has passed through the first through holes, and granules having a relatively small diameter are obtained from the granulation material that has passed through the second through holes. Accordingly, it is possible to obtain an excrement treatment material that contains grains of different diameters in a mixed manner, without executing a mixing step after the granulation by the granulation machine.

Advantageous Effects of Invention

According to the present invention, it is possible to implement a method and an apparatus for manufacturing an excrement treatment material, with which it is possible to obtain an excrement treatment material that contains grains of different diameters in a mixed manner, without executing a mixing step.

DESCRIPTION OF EMBODIMENTS

Hereinafter, an embodiment of the present invention will be described in detail with reference to the drawings. In the description of the drawings, the same elements are given the same reference numerals, and a redundant description will be omitted.

Figure 1:
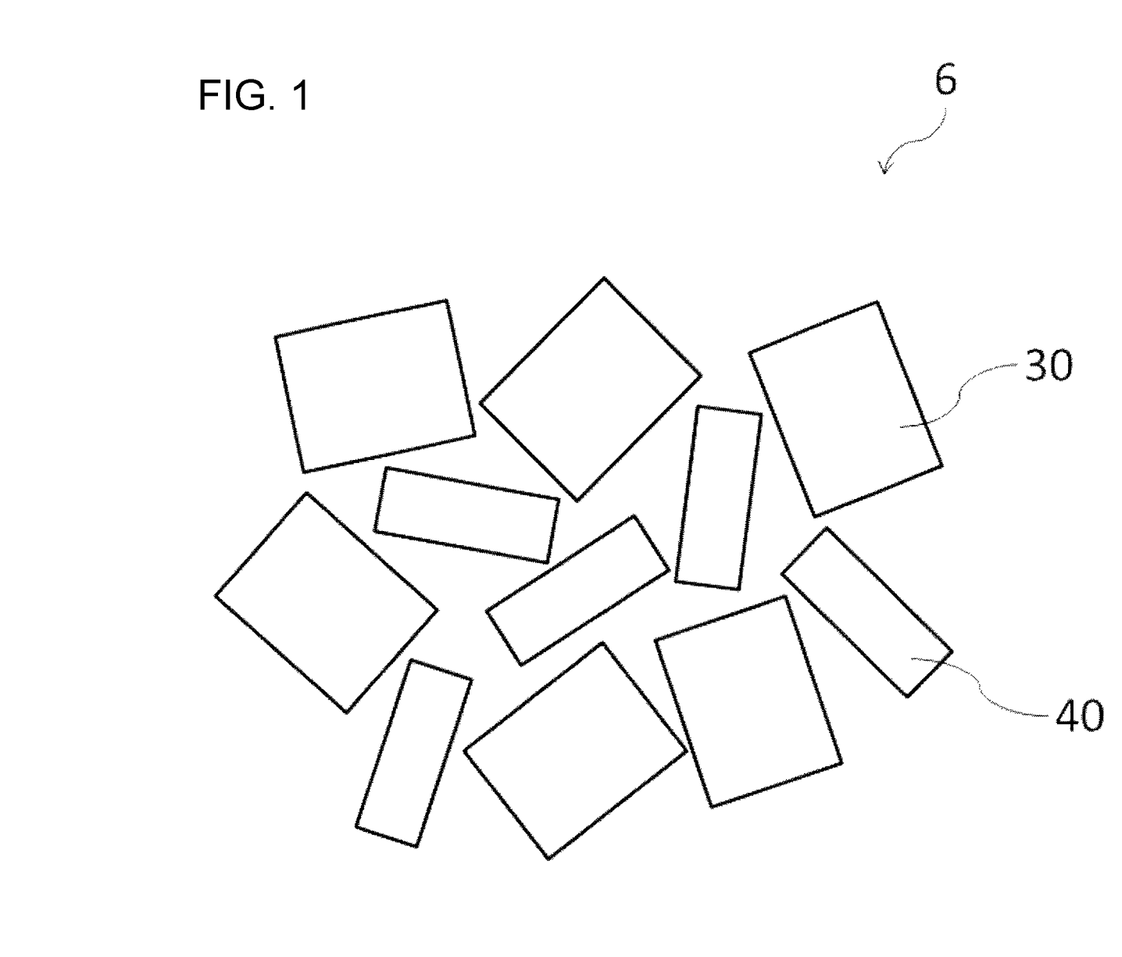
FIG. 1 is a schematic diagram of an excrement treatment material according to an embodiment of the present invention.

FIG. 1 is a schematic diagram showing an excrement treatment material according to an embodiment of the present invention. An excrement treatment material 6 is an excrement treatment material that is composed of a plurality of grains, and contains grains 30 and grains 40. The grains 30 and 40 have mutually different diameters. That is, the diameter of the grains 30 is larger than the diameter of the grains 40. In the excrement treatment material 6, grains 30 and 40 that have different diameters are present in a mixed manner. The length of the grains 30 and the length of the grains 40 are substantially equal. The excrement treatment material 6 is a material used in the disposal of excrement from an animal such as a cat by absorbing the excrement.

Figure 2:
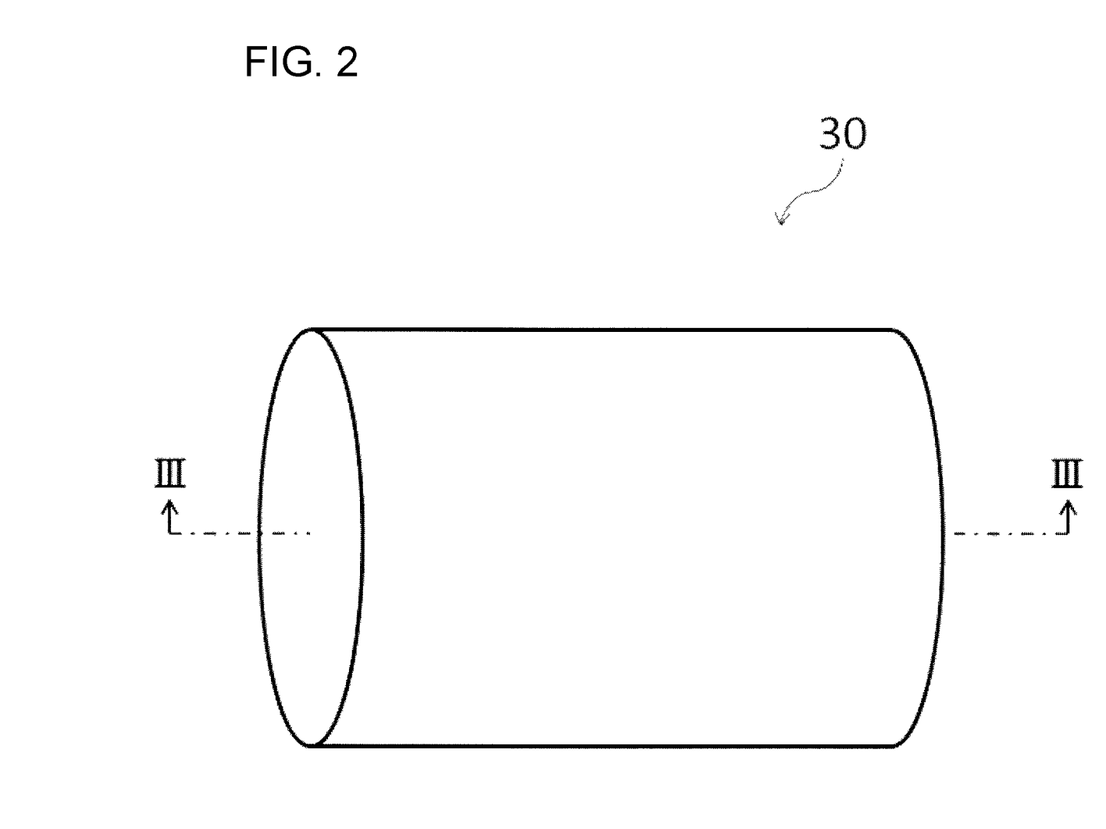
FIG. 2 is a perspective view of a grain 30 contained in the excrement treatment material shown in FIG. 1.
Figure 3:
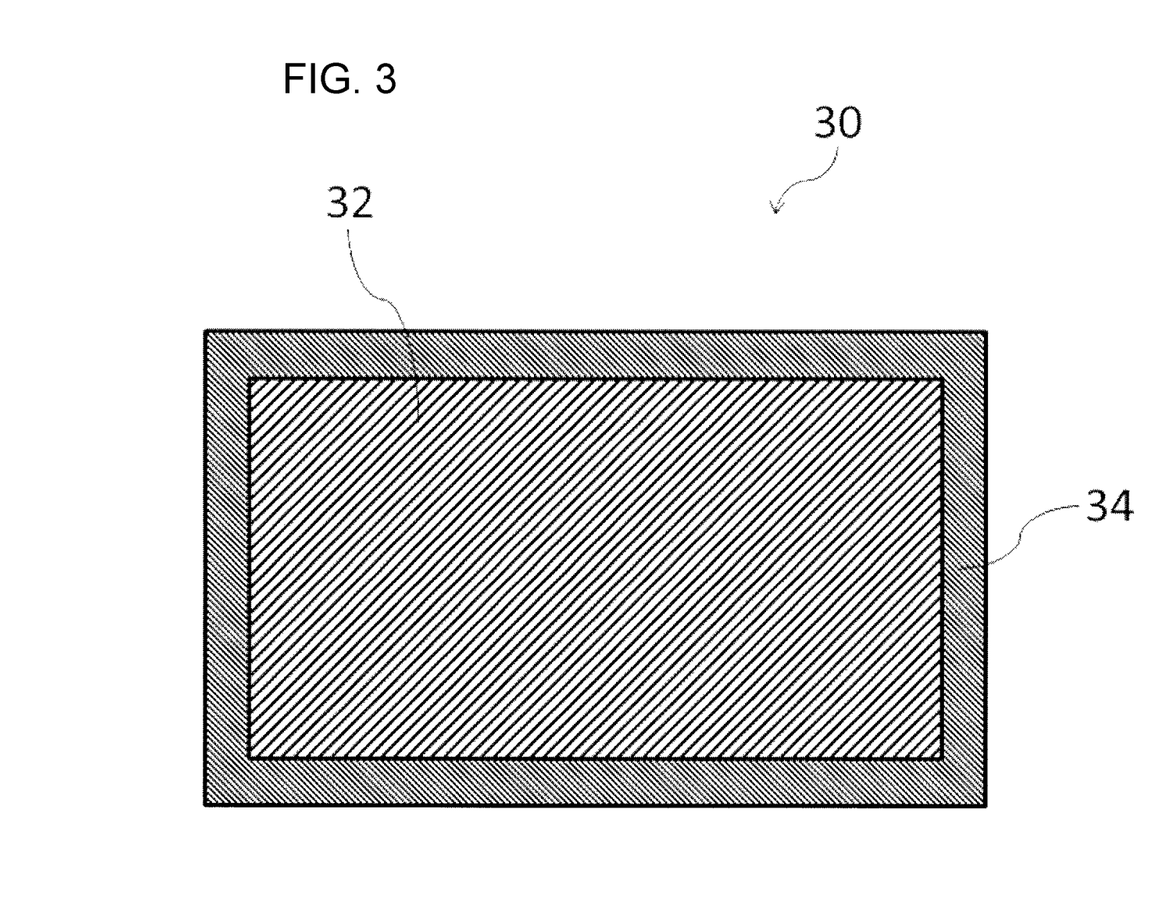
FIG. 3 is a cross-sectional view taken along the line III-III shown in FIG. 2.

FIG. 2 is a perspective view of a grain 30. FIG. 3 is a cross-sectional view taken along the line III-III shown in FIG. 2. The grain 30 has a substantially cylindrical shape. The grain 30 includes a core portion 32 (granule) and a coating portion 34. The core portion 32 is formed in a substantially cylindrical shape. The core portion 32 is a granule obtained from a granulation material that has passed through a through hole 13a of a die 12, which will be described later. The core portion 32 has a function of absorbing and retaining excrement. The core portion 32 preferably contains an organic substance as the main material. As used herein, the main material of the core portion 32 refers to one of the materials constituting the core portion 32 that accounts for the highest proportion by weight in the core portion 32. Papers, used tea leaves, plastics, or soybean refuse, for example, can be used as the organic substance.

Papers refer to a material composed mainly of pulp. Examples of papers include ordinary paper, a vinyl chloride wallpaper classified product (paper obtained by classifying vinyl chloride wallpaper), a fluff pulp, papermaking sludge, pulp sludge, and the like. A disposable diaper classified product (plastic obtained by classifying disposable diapers), for example, can be used as the plastics. The soybean refuse is preferably dried soybean refuse.

The coating portion 34 covers the core portion 32. The coating portion 34 may cover the entire surface of the core portion 32, or may cover only a portion of the surface of the core portion 32. The coating portion 34 has a function of bonding grains 30 and 40 that have absorbed excrement while in use, and clumping them together. The coating portion 34 also preferably contains an organic substance as the main material.

The coating portion 34 contains an adhesive material. As the adhesive material, it is possible to use, for example, starch, CMC (carboxymethyl cellulose), PVA (polyvinyl alcohol), dextrin, or a water-absorbent polymer.

Figure 4:
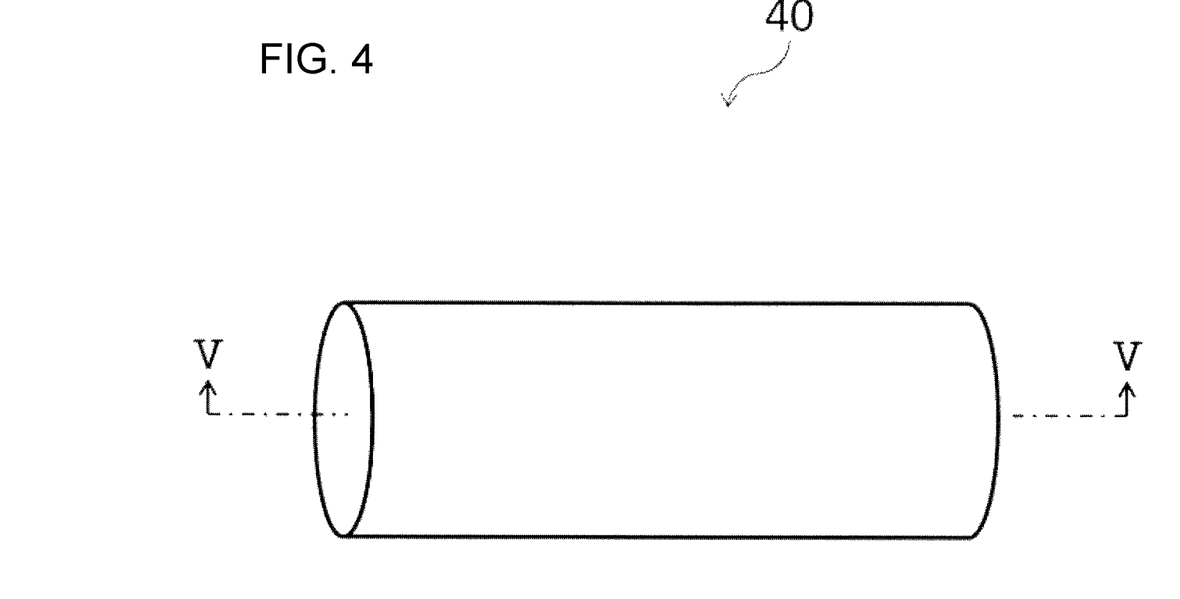
FIG. 4 is a perspective view of a grain 40 contained in the excrement treatment material shown in FIG. 1.
Figure 5:
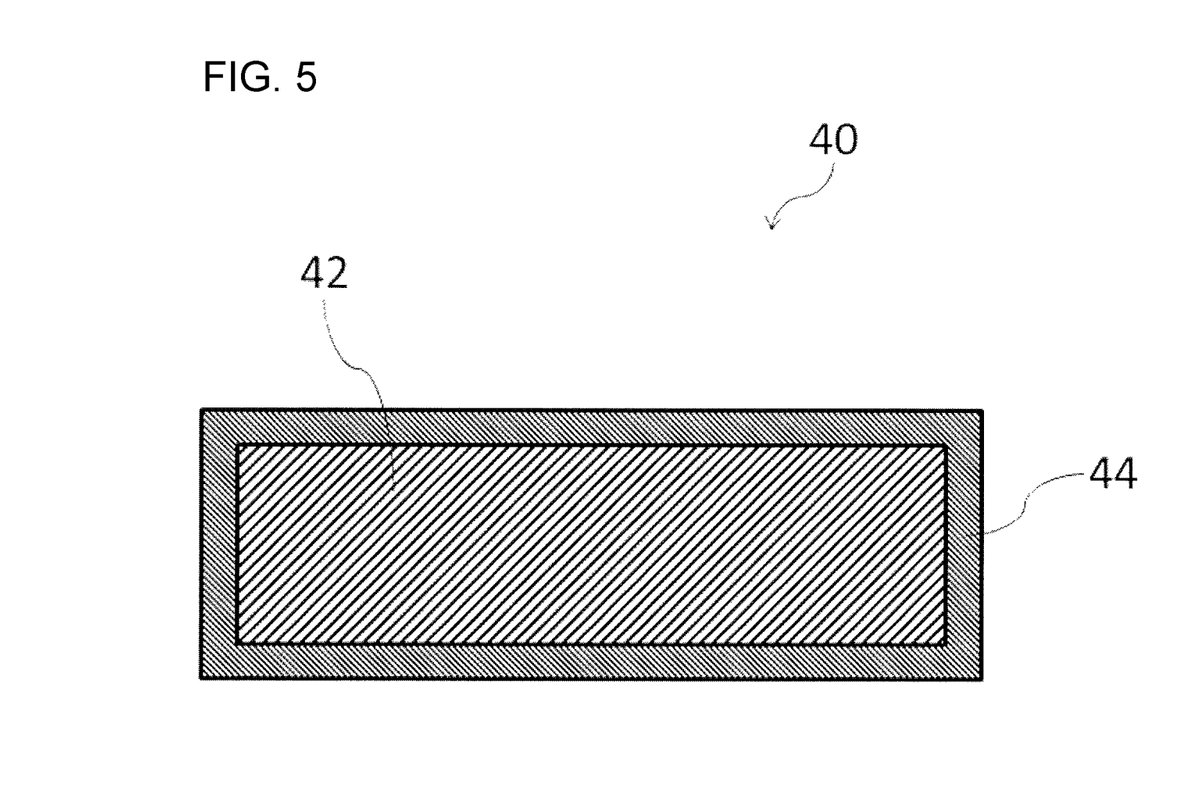
FIG. 5 is a cross-sectional view taken along the line V-V shown in FIG. 4.

FIG. 4 is a perspective view of a grain 40. FIG. 5 is a cross-sectional view taken along the line V-V shown in FIG. 4. The grain 40 has a substantially cylindrical shape. The grain 40 includes a core portion 42 (granule) and a coating portion 44. The core portion 42 is formed in a substantially cylindrical shape. The core portion 42 is a granule obtained from the granulation material that has passed through a through hole 13b of the die 12, which will be described later. The diameter of the core portion 42 is smaller than the diameter of the core portion 32. The length of the core portion 32 and the length of the core portion 42 are substantially equal. The core portion 42 has a function of absorbing and retaining excrement. The core portion 42 is made of the same material as the material of the core portion 32.

The coating portion 44 covers the core portion 42. The coating portion 44 may cover the entire surface of the core portion 42, or may cover only a portion of the surface of the core portion 42. The coating portion 44 has a function of bonding grains 30 and 40 that have absorbed excrement while in use, and clumping them together. The coating portion 44 is made of the same material as the material of the coating portion 34.

Figure 6:
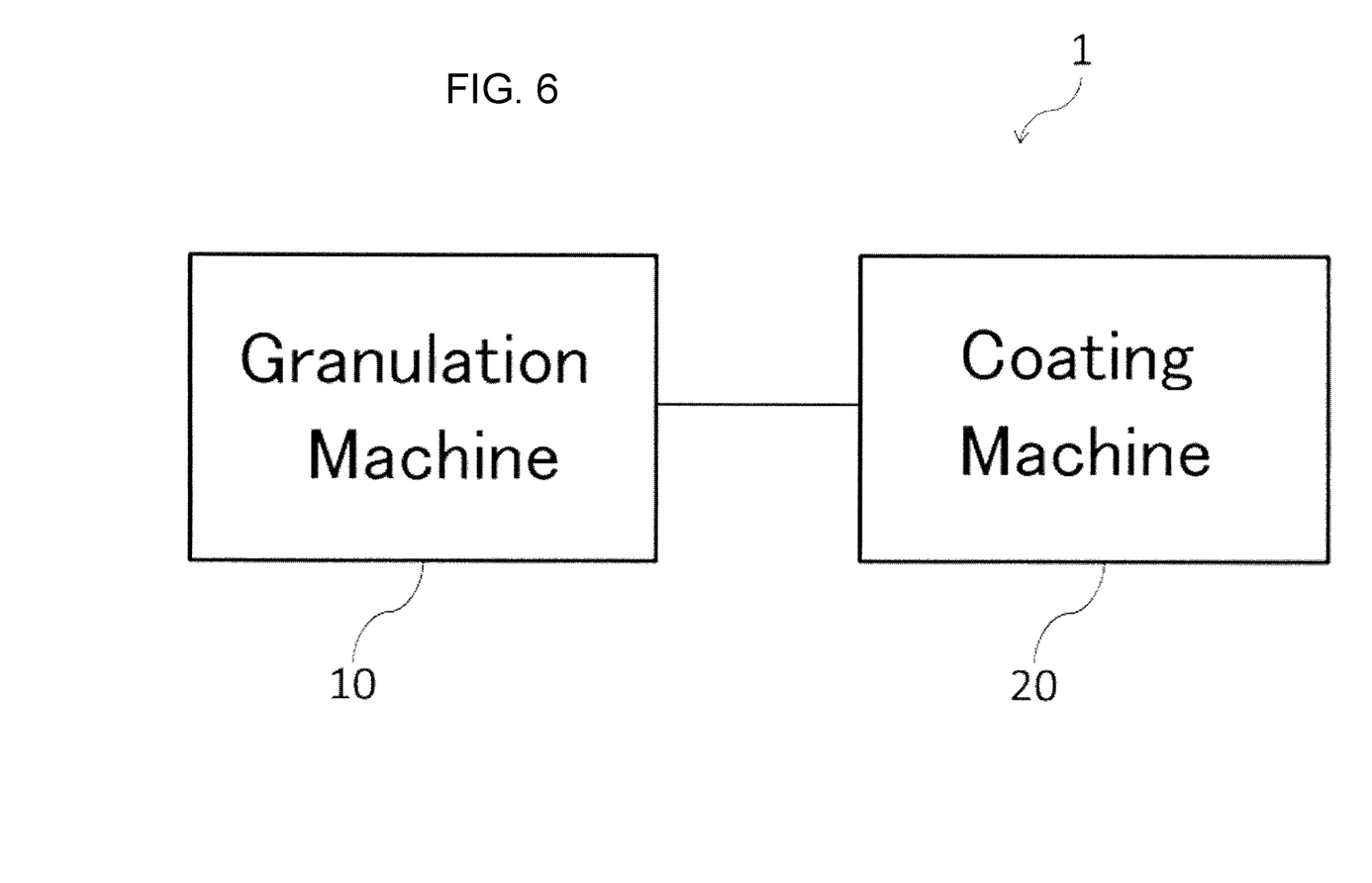
FIG. 6 is a configuration diagram of an apparatus for manufacturing an excrement treatment material according to an embodiment of the present invention.

FIG. 6 is a configuration diagram of an apparatus for manufacturing an excrement treatment material according to an embodiment of the present invention. A manufacturing apparatus 1 is an apparatus for manufacturing the above-described excrement treatment material 6. The manufacturing apparatus 1 includes a granulation machine 10 and a coating machine 20.

Figure 7:
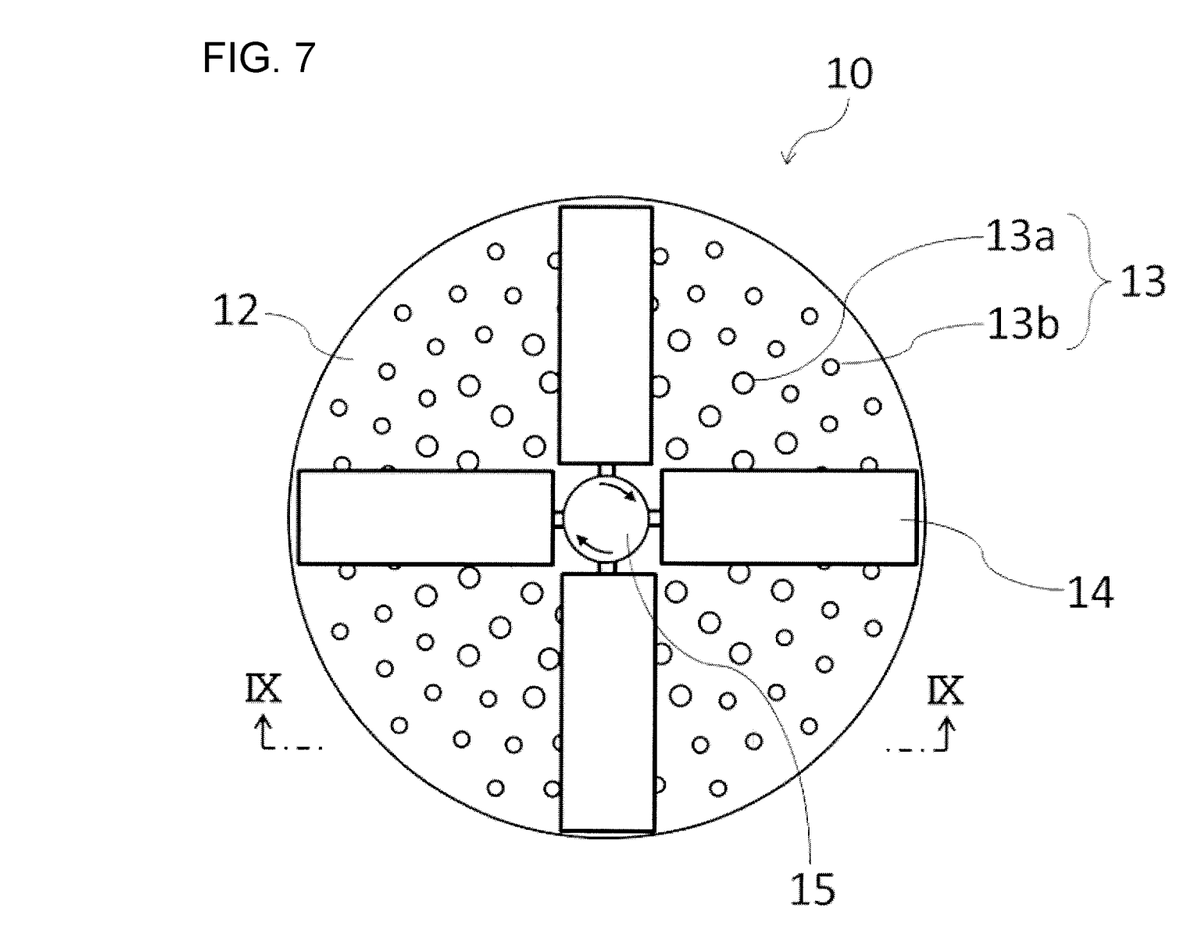
FIG. 7 is a plan view of a granulation machine 10 included in the manufacturing apparatus shown in FIG. 6.
Figure 8:
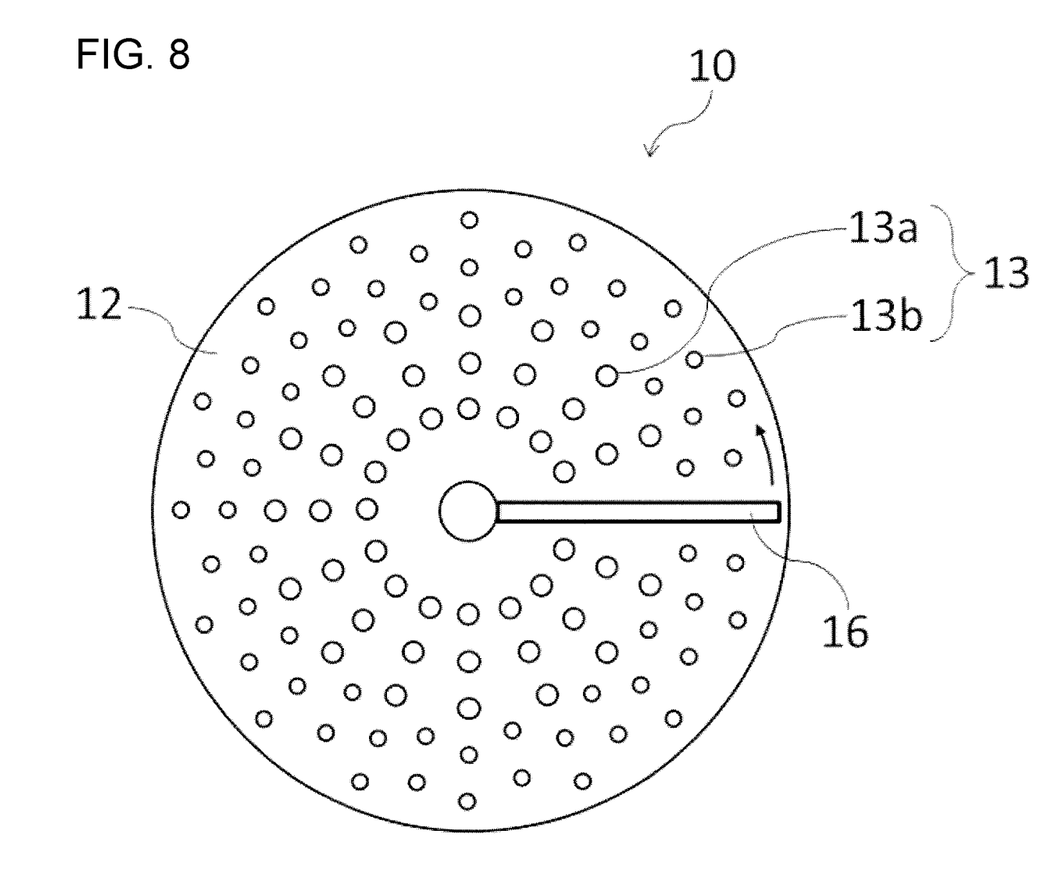
FIG. 8 is a bottom view of the granulation machine 10 included in the manufacturing apparatus shown in FIG. 6.
Figure 9:
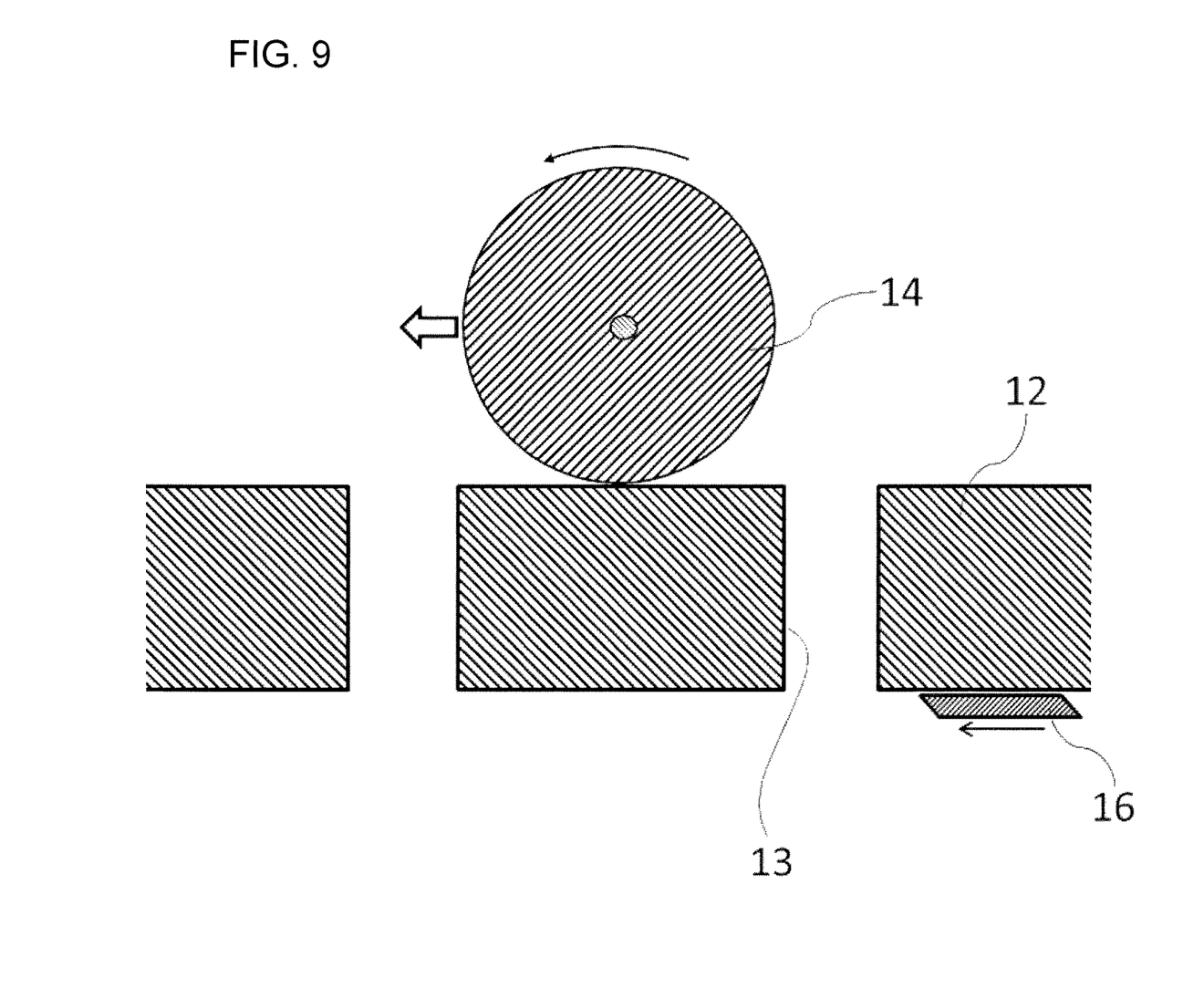
FIG. 9 is a diagram showing a part of the end face along the line IX-IX shown in FIG. 7.

FIGS. 7 and 8 are respectively a plan view and a bottom view of the granulation machine 10. Also, FIG. 9 is a diagram showing a part of the end face along the line IX-IX shown in FIG. 7. The granulation machine 10 is an extrusion granulation machine that forms a plurality of granules (core portions 32 and 42) by performing extrusion granulation on a granulation material (a material for forming the core portions 32 and 42). The granulation machine 10 includes a die 12, a roller 14 and a cutter 16. A plurality of through holes 13 that allow the granulation material to pass therethrough are formed in the die 12. Note that "plurality of through holes 13" refer to all of the through holes 13 formed in the die 12 unless otherwise indicated in the descriptions below. Each of the through holes 13 is circular in plan view. The plurality of through holes 13 are distributed substantially over the entire surface of the die 12.

The plurality of through holes 13 include through holes 13a (first through holes), and through holes 13b (second through holes). The through holes 13a have a first diameter. The through holes 13b have a second diameter that is smaller than the first diameter. The first diameter and the second diameter are defined as the diameters of the through hole 13a and the through hole 13b respectively at the surface of the die 12. The second diameter is preferably not more than 70% of the first diameter, and more preferably not more than 50% of the first diameter.

In the present embodiment, the plurality of through holes 13 consist only of the through holes 13a and the through holes 13b. The number of the through holes 13b formed in the die 12 is preferably between 40% and 60% inclusive with respect to the total number of the through holes 13a and the through holes 13b formed in the die 12. The through holes 13b are disposed outside the through holes 13a in a radial direction of the die 12. That is, the through holes 13b are disposed at positions farther from a rotation shaft 15, which will be described later, than the through holes 13a. For that reason, the diameters of the plurality of through holes 13 monotonously decrease as going away from the rotation shaft 15.

As shown in FIG. 7, the roller 14 is provided on the front surface side of the die 12 (the side into which the granulation material enters). The roller 14 has a cylindrical shape, and its central axis extends in a radial direction of the die 12. In the present embodiment, a plurality of the rollers 14 (specifically four rollers 14) are provided. An end of each of the rollers 14 is connected to the rotation shaft 15 located at the center portion of the front surface of the die 12. The rollers 14 push the granulation material into each of the through holes 13 while revolving around the rotation shaft 15. In the present embodiment, each of the rollers 14 rotates around its central axis, and revolves around the rotation shaft 15. The rollers 14 can pass over all of the through holes 13 formed in the die 12.

As shown in FIG. 8, the cutter 16 is provided on the back surface side of the die 12 (the side from which the granulation material is discharged). The cutter 16 extends in a radial direction of the die 12 from the center portion of the back surface of the die 12. The cutter 16 cuts the granulation material that has been extruded from each of the through holes 13 while rotating along the back side of the die 12. To be specific, the cutter 16 rotates about the center portion of the die 12 within a plane that is parallel to the back surface of the die 12. The cutter 16 is configured to be capable of rotating independently from the rollers 14 described above. The cutter 16 can pass over all of the through holes 13 formed in the die 12.

Figure 10:
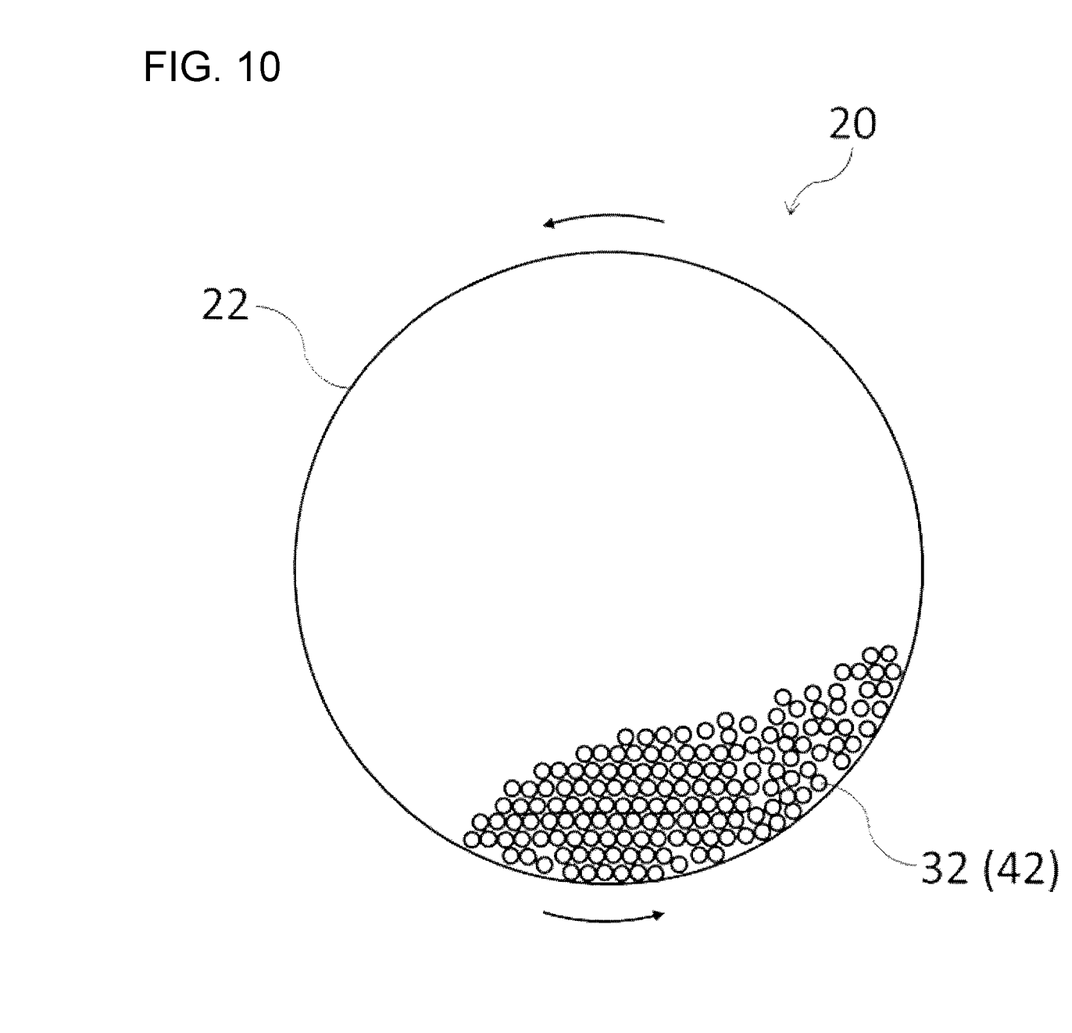
FIG. 10 is a diagram illustrating a structure of a coating machine 20 included in the manufacturing apparatus shown in FIG. 6.

Referring back to FIG. 6, the coating machine 20 is a machine for coating each of the granules (core portions 32 and 42) formed by the granulation machine 10 with a coating material (a material for forming the coating portions 34 and 44). As shown in FIG. 10, the coating machine 20 includes a drum 22 (container). The drum 22 has a substantially circular tube shape, and is provided so as to be capable of rotating. Specifically, the drum 22 is rotatable about its central axis. The central axis of the drum 22 is horizontal. A plurality of core portions 32 and 42 formed by the granulation machine 10 are housed in the drum 22. The coating machine 20 causes the coating material to be attached to the outer surface of each of the core portions 32 and 42 while rotating the drum 22 in which the core portions 32 and 42 are housed.

Next, a method for manufacturing an excrement treatment material according to an embodiment of the present invention will be described in conjunction with the operations of the manufacturing apparatus 1. The manufacturing method includes a granulation step and a coating step. The granulation step is a step of forming a plurality of core portions 32 and 42 by performing extrusion granulation on a granulation material using the granulation machine 10. Prior to granulation, the granulation material is subjected to pre-treatment such as pulverization, kneading, and adding water, as needed.

Figure 11:
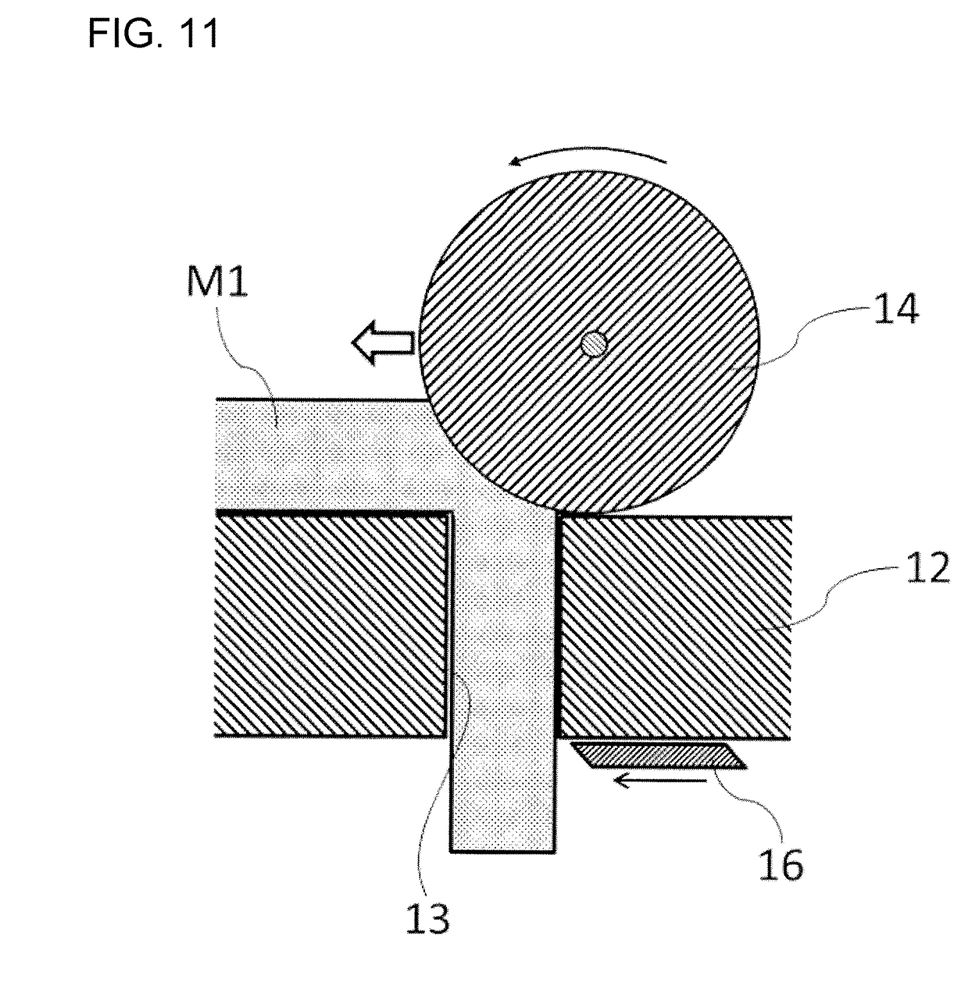
FIG. 11 is a diagram illustrating a granulation step of a method for manufacturing an excrement treatment material according to an embodiment of the present invention.
Figure 12:
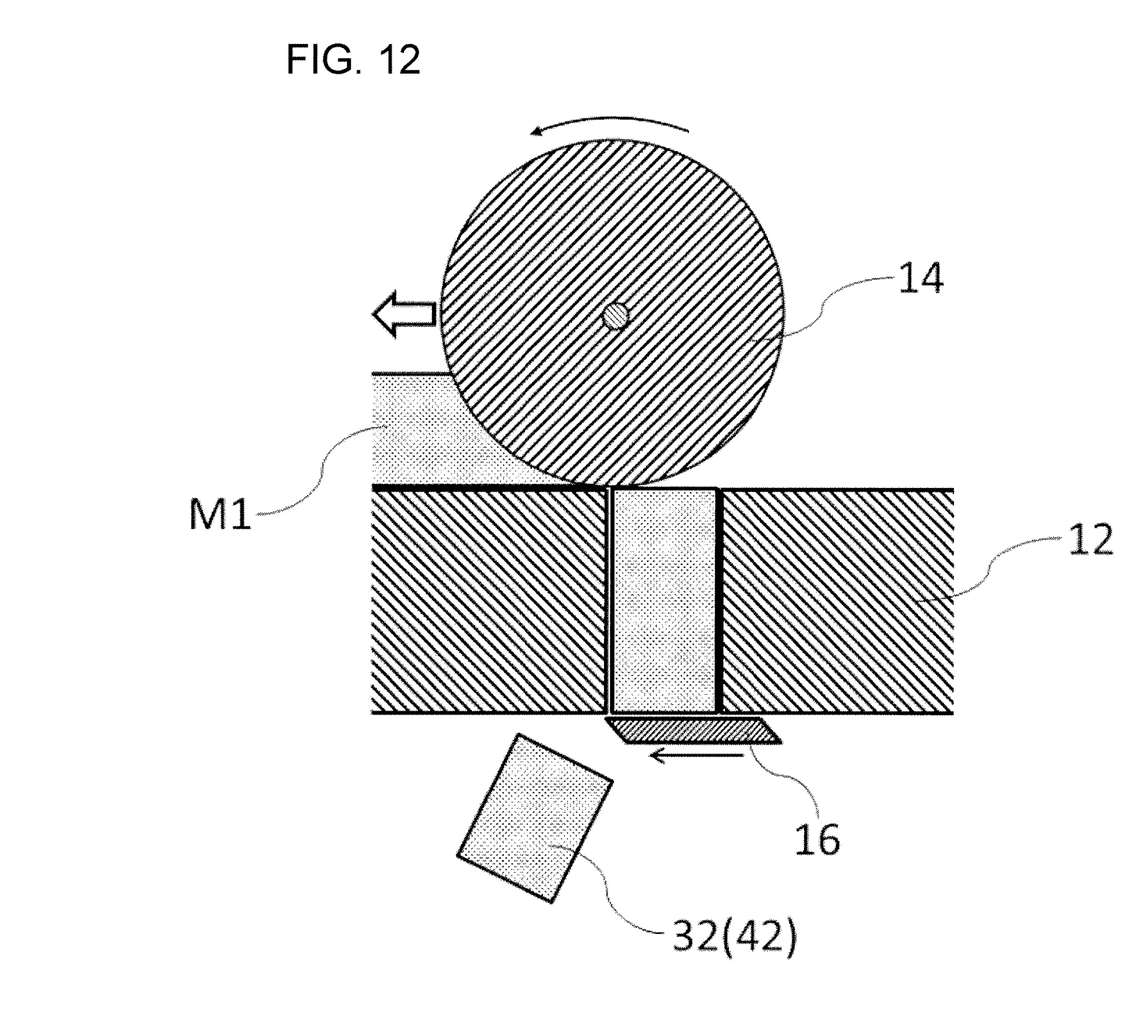
FIG. 12 is a diagram illustrating the granulation step of the method for manufacturing an excrement treatment material according to an embodiment of the present invention.

In the granulation step, as shown in FIG. 11, a granulation material M1 supplied on the front surface side of the die 12 is pushed into the through holes 13 by the rollers 14 rolling on the front surface of the die 12. The granulation material M1 pushed into the through holes 13 is extruded toward the back surface side of the die 12. On the back surface side of the die 12, the cutter 16 continuously rotates while the granulation material M1 is extruded. As a result, as shown in FIG. 12, the granulation material M1 that has been extruded from the through holes 13 is cut by the cutter 16. Cut portions obtained through the cutting in the manner described above are granules (core portions 32 and 42).

The coating step is a step of coating each of the granules formed in the granulation step with a coating material. In the coating step, the core portions 32 and 42 formed in the granulation step are housed in the drum 22 (see FIG. 10), and thereafter the coating material is attached to the outer surface of each of the core portions 32 and 42 while rotating the drum 22. The coating material may be attached by, for example, sprinkling or spraying the coating material. In this way, coating portions 34 and 44 are formed. Then, post-treatment such as sieving and drying is performed as needed. Through the above processing, the excrement treatment material 6 that contains the grains 30 and the grains 40 in a mixed manner is obtained.

Advantageous effects of the present embodiment will be described. In the present embodiment, the granulation machine 10 including the die 12 in which the through holes 13a and the through holes 13b are formed is used. The diameter (second diameter) of the through holes 13b is smaller than the diameter (first diameter) of the through holes 13a. For this reason, granules (core portions 32) having a relatively large diameter are obtained from the granulation material that has passed through the through holes 13a, and granules (core portions 42) having a relatively small diameter are obtained from the granulation material that has passed through the through holes 13b. Accordingly, it is possible to obtain the excrement treatment material 6 that contains the grains 30 and 40 of different diameters in a mixed manner, without executing a mixing step after the granulation step.

The excrement treatment material 6 is used by being placed in an animal litter box. In the animal litter box, an animal such as a cat discharges excrement onto the excrement treatment material 6 while the animal is standing directly on the excrement treatment material 6. Accordingly, if gaps between grains that constitute the excrement treatment material 6 are large, the excrement treatment material 6 may significantly sink when an animal walks on it, and the animal may be unstable on its feet. To address this, in the excrement treatment material 6, in addition to the grains 30, the grains 40 that have a diameter that is smaller than the diameter of the grains 30 are provided. With this configuration, when the excrement treatment material 6 is placed in the animal litter box, the grains 40 enter the gaps between the grains 30. For this reason, a plurality of grains (grains 30 and 40) can be placed in the animal litter box at a higher density than when the configuration in which the excrement treatment material 6 is composed only of the grains 30 is used. Accordingly, with the excrement treatment material 6, it is possible to suppress sinking while the animal is on the excrement treatment material 6.

In order to make it easy for the grains 40 to enter the gaps between the grains 30, it is advantageous that the diameter of the grains 40 is sufficiently smaller than the diameter of the grains 30. From this viewpoint, the second diameter is preferably not more than 70% of the first diameter, and more preferably not more than 50% of the first diameter.

In the case where the number of the through holes 13b is between 40% and 60% inclusive with respect to the total number of the through holes 13a and the through holes 13b, it is possible to obtain the excrement treatment material 6 that contains two types of grains (grains 30 and 40) in a mixed manner with good balance.

In the granulation machine 10, the granulation material is pushed into the through holes 13 by the rollers 14 that revolve around the rotation shaft 15. In such a configuration, the force of the rollers 14 pushing the granulation material weakens as going away from the rotation shaft 15. That is, there are differences in the force of the rollers 14 pushing the granulation material depending on the distance from the rotation shaft 15. Such force differences cause variations in the hardness of granules to be obtained.

To address this, in the present embodiment, the diameters of the plurality of through holes 13 monotonously decrease as going away from the rotation shaft 15. Specifically, the through holes 13b are disposed outside the through holes 13a in a radial direction of the die 12. In the case where the force of pushing the granulation material is identical, the pressure applied to the granulation material increases as the diameter of the through holes 13 becomes smaller. Therefore, it is possible to suppress variations in the hardness of granules (core portions 32 and 42) by disposing the through holes 13b having the relatively small diameter at positions relatively far from the rotation shaft 15 (positions in which the force of pushing the granulation material is relatively weak), and disposing the through holes 13a having the relatively large diameter at positions relatively close to the rotation shaft 15 (positions in which the force of pushing the granulation material is relatively strong).

During the coating, the coating material is attached to the outer surface of each of the core portions 32 and 42 while rotating the drum 22 in which the core portions 32 and 42 are housed. By doing so, it is possible to uniformly attach the coating material to the entire outer surface of each of the core portions 32 and 42. Also, as a result of the drum 22 being rotated, the core portions 32 and 42 are agitated, and it is therefore possible to further suppress uneven distribution of the grains 30 (grains 40) in the manufactured excrement treatment material 6.

Figure 13:
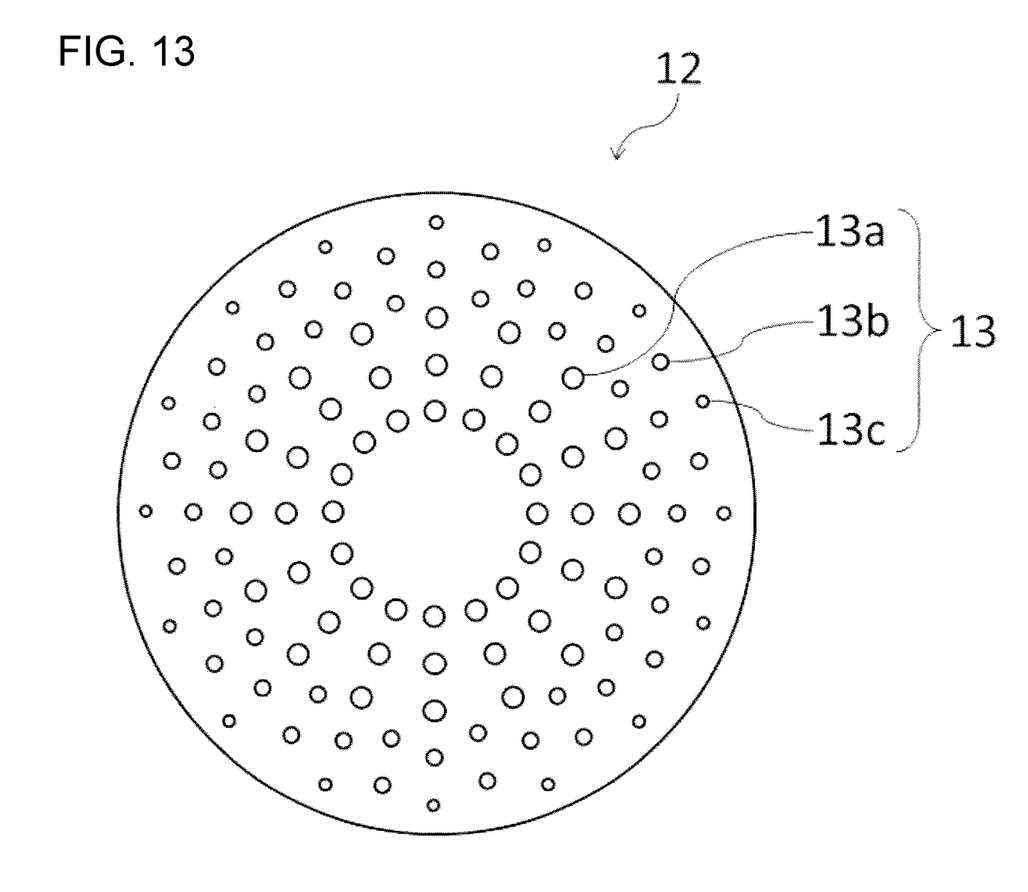
FIG. 13 is a plan view of a die 12 according to a modified example.

The present invention is not limited to the embodiment given above, and various modifications can be made. In the embodiment given above, an example has been described in which the die 12 is provided with two types of through holes (the through holes 13a and the through holes 13b). However, the die 12 may be provided with three or more types of through holes having different diameters. For example, as shown in FIG. 13, the plurality of through holes 13 may include through holes 13c (third through holes) in addition to the through holes 13a and the through holes 13b. The through holes 13c have a third diameter that is smaller than the second diameter. The third diameter is preferably not more than 70% of the second diameter, and more preferably not more than 50% of the second diameter. The through holes 13c are disposed outside the through holes 13b in a radial direction of the die 12.

In the embodiment given above, an example has been described in which the planar shape of the through hole 13 is circular. However, the planar shape of the through hole 13 is arbitrary, and may be elliptic or polygonal, for example. In the case where the planar shape of the through hole 13 is not circular, the diameter of the through hole 13 is defined as the diameter of the minimum circle that can contain the through hole 13.

In the embodiment given above, an example has been described in which the diameters of the plurality of through holes 13 monotonously decrease as going away from the rotation shaft 15. However, plural types of through holes having different diameters may be disposed in an arbitrary positional relation. For example, a through hole having a relatively small diameter may be disposed inside a through hole having a relatively large diameter in a radial direction of the die 12. Also, plural types of through holes having different diameters may be disposed in the die 12 at random.

In the embodiment given above, an example has been described in which the granulation machine 10 is provided with the rollers 14. However, the granulation machine 10 need not be provided with the rollers 14. In that case, the granulation material may be pushed into each of the through holes 13 by known means other than the rollers 14.

In the embodiment given above, an example has been described in which the granulation machine 10 is provided with the cutter 16. However, the granulation machine 10 need not be provided with the cutter 16. In that case, the granulation material that has been extruded from each of the through holes 13 may be cut by known means other than the cutter 16.

In the embodiment given above, an example has been described in which each grain 30 has a multi-layer structure composed of the core portion 32 and the coating portion 34. However, there is no need to provide the coating portion 34. That is, each grain 30 may have a single-layer structure composed only of the core portion 32. The same applies to the grains 40. In this case, it is unnecessary to provide the coating machine 20, and the coating step is not executed.

In the embodiment given above, an example has been described in which the grains 30 and 40 are water-absorbent grains used in the disposal of excrement by absorbing the excrement. However, the grains 30 and 40 may be water-permeable grains that are used in the disposal of excrement by allowing the excrement to permeate therethrough. There are two types of water-permeable grains: grains that allow excrement to pass through the interior of the grains; and grains that allow excrement to pass through the gaps between the grains. An example of the latter grains is water-repellent grains.

LIST OF REFERENCE NUMERALS

1 Manufacturing Apparatus
6 Excrement Treatment Material
10 Granulation Machine
12 Die
13 Through Hole
13a Through Hole (First Through Hole)
13b Through Hole (Second Through Hole)
13c Through Hole (Third Through Hole)
14 Roller
15 Rotation Shaft
16 Cutter
20 Coating Machine
22 Drum (Container)
30 Grain
32 Core Portion (Granule)
34 Coating Portion
40 Grain
42 Core Portion (Granule)
44 Coating Portion

The invention claimed is:

1. A method for manufacturing an excrement treatment material comprising:
   a granulation step of forming a plurality of granules by performing extrusion granulation on a granulation material using a granulation machine,
   wherein the granulation machine includes:
      a die in which a plurality of through holes that allow the granulation material to pass therethrough are formed, a rotation shaft that is located at a center portion of the die, and a roller that pushes the granulation material into each of the through holes while revolving around the rotation shaft, the plurality of through holes include first through holes having a first diameter, and second through holes having a second diameter that is smaller than the first diameter, and the second through holes are provided at positions farther from the rotation shaft than the first through holes.

2. The method for manufacturing an excrement treatment material according to claim 1, wherein the second diameter is not more than 70% of the first diameter.

3. The method for manufacturing an excrement treatment material according to claim 2, wherein the second diameter is not more than 50% of the first diameter.

4. The method for manufacturing an excrement treatment material according to claim 1, wherein the number of the second through holes formed in the die is between 40% and 60% inclusive with respect to the total number of the first and second through holes formed in the die.

5. The method for manufacturing an excrement treatment material according to claim 1, wherein diameters of the plurality of through holes monotonously decrease as going away from the rotation shaft.

6. The method for manufacturing an excrement treatment material according to claim 1, wherein the plurality of through holes include third through holes having a third diameter that is smaller than the second diameter.

7. The method for manufacturing an excrement treatment material according to claim 6, wherein the third diameter is not more than 70% of the second diameter.

8. The method for manufacturing an excrement treatment material according to claim 7, wherein the third diameter is not more than 50% of the second diameter.

9. The method for manufacturing an excrement treatment material according to claim 1, comprising a coating step of coating each of the granules formed in the granulation step with a coating material.

10. The method for manufacturing an excrement treatment material according to claim 9, wherein, in the coating step, the coating material is attached to an outer surface of each of the granules while rotating a container in which the plurality of granules formed in the granulation step are housed.

11. An apparatus for manufacturing an excrement treatment material comprising:

a granulation machine that forms a plurality of granules by performing extrusion granulation on a granulation material, the granulation machine including:

a die in which a plurality of through holes that allow the granulation material to pass therethrough are formed, a rotation shaft that is located at a center portion of the die, and a roller that pushes the granulation material into each of the through holes while revolving around the rotation shaft, wherein the plurality of through holes include first through holes having a first diameter, and second through holes having a second diameter that is smaller than the first diameter, and the second through holes are provided at positions farther from the rotation shaft than the first through holes.

12. The apparatus for manufacturing an excrement treatment material according to claim 11, wherein the second diameter is not more than 70% of the first diameter.

13. The apparatus for manufacturing an excrement treatment material according to claim 11, wherein diameters of the plurality of through holes monotonously decrease as going away from the rotation shaft.

14. The apparatus for manufacturing an excrement treatment material according to claim 11, wherein the plurality of through holes include third through holes having a third diameter that is smaller than the second diameter.

15. The apparatus for manufacturing an excrement treatment material according to claim 11, comprising a coating machine that coats each of the granules formed by the granulation machine with a coating material.

16. The apparatus for manufacturing an excrement treatment material according to claim 15, wherein the coating machine includes a container that houses the plurality of granules formed by the granulation machine, and causes the coating material to be attached to an outer surface of each of the granules while rotating the container in which the plurality of granules are housed.

* * * * *